United States Patent
Wilkins (10) Patent No.: US 9,501,294 B2
(45) Date of Patent: *Nov. 22, 2016

(54) METHOD FOR AUTOMATING DIGITAL SIGNAGE APPLICATIONS USING INTELLIGENT SELF-CONFIGURING OBJECTS AND SMART TEMPLATES

(71) Applicant: X2O Media Inc., Montreal (CA)

(72) Inventor: David Wilkins, Montreal (CA)

(73) Assignee: X2O Media Inc., Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/186,622

(22) Filed: Feb. 21, 2014

(65) Prior Publication Data
US 2015/0052438 A1 Feb. 19, 2015

Related U.S. Application Data

(63) Continuation of application No. 12/101,396, filed on Apr. 11, 2008, now Pat. No. 8,683,340.

(60) Provisional application No. 60/911,572, filed on Apr. 13, 2007.

(51) Int. Cl.
| | |
|---|---|
| G06F 3/048 | (2013.01) |
| G06F 9/44 | (2006.01) |
| G06F 3/0484 | (2013.01) |
| G06F 17/22 | (2006.01) |

(52) U.S. Cl.
CPC ........... *G06F 9/4443* (2013.01); *G06F 3/0484* (2013.01); *G06F 17/22* (2013.01)

(58) Field of Classification Search
None
See application file for complete search history.

(56) References Cited

U.S. PATENT DOCUMENTS

| | | | |
|---|---|---|---|
| 5,339,392 A * | 8/1994 | Risberg | G06F 3/0481 715/255 |
| 5,812,394 A | 9/1998 | Lewis et al. | |
| 6,055,522 A * | 4/2000 | Krishna | G06F 17/30893 715/205 |
| 6,167,406 A * | 12/2000 | Hoskins | G06F 17/30289 705/1.1 |
| 7,178,101 B2 * | 2/2007 | Tunning | G06F 17/2247 707/E17.006 |
| 7,312,803 B2 | 12/2007 | Wilkins | |
| 7,565,640 B2 * | 7/2009 | Shukla | G06F 8/10 715/234 |
| 2004/0133595 A1* | 7/2004 | Black | G06F 17/24 707/999.103 |
| 2005/0240872 A1* | 10/2005 | Roeske | A63B 71/06 715/716 |
| 2005/0264583 A1* | 12/2005 | Wilkins | G09G 5/397 345/629 |
| 2006/0247983 A1* | 11/2006 | Dalli | G06F 17/27 705/26.1 |
| 2006/0248480 A1* | 11/2006 | Faraday | G06F 17/248 715/866 |
| 2007/0022382 A1* | 1/2007 | Honkaniemi | G06F 17/30873 715/733 |
| 2007/0074268 A1* | 3/2007 | Pepper | H04N 21/2143 725/136 |
| 2008/0065974 A1* | 3/2008 | Campbell | G06F 17/248 715/200 |
| 2008/0189638 A1* | 8/2008 | Mody | G05B 19/0426 715/771 |

\* cited by examiner

*Primary Examiner* — Hua Lu
(74) *Attorney, Agent, or Firm* — Brett J. Slaney; Blake, Cassels & Graydon LLP (57) ABSTRACT

A digital signage content management system is provided that uses existing interfaces such as web interfaces and turns existing commercially available graphics programs such as web based tools or locally run programs such as Microsoft PowerPoint® into a digital signage platform to facilitate developing and managing digital signage applications through the creation of smart objects and intelligent templates that are easy to create and easy to modify to suit different applications. This enables digital signage content to be professionally created without requiring custom programming for each and every stream of new and/or changing content. The smart objects and intelligent templates can also be used to provide content with changing elements in real-time.

10 Claims, 10 Drawing Sheets

METHOD FOR AUTOMATING DIGITAL SIGNAGE APPLICATIONS USING INTELLIGENT SELF-CONFIGURING OBJECTS AND SMART TEMPLATES

CROSS-REFERENCE TO RELATED APPLICATIONS

This application is a continuation of U.S. patent application Ser. No. 12/101,396 filed on Apr. 11, 2008 which claims priority from U.S. provisional application No. 60/911,572 filed on Apr. 13, 2007, both incorporated herein by reference.

TECHNICAL FIELD

The present invention relates to digital signage applications and has particular utility in automating such digital signage applications.

BACKGROUND

The market for public information displays has evolved considerably over the past years to include full motion video content combined with images and text displayed on high-resolution video graphics screens. It is becoming more and more common to see these kinds of digital signage systems in shopping centers, hotels, university campuses, and corporate lobbies. For the most part, the process of creating and managing content to be displayed on these screens has involved using standard graphics and video production tools to produce pre-rendered video clips that are then played back according to a predefined schedule or play list.

More recently, tools have become available that allow individual content elements such as graphics, animations, and video to be dynamically composited and rendered into a video stream in real-time, without requiring the need for pre-rendering all content into a single video file. This allows independent elements or layers of content to be changed "on the fly" in response to specific data conditions. In a typical example, a weather display could automatically show the latest temperature and meteorological conditions throughout the day while the latest news headlines scroll in a ticker at the bottom of the screen. As the weather changes or breaking news becomes available, the content on the screen is automatically updated.

Whereas conventional digital signage systems have used DVD players or other simple video playback systems to display pre-rendered content, real-time digital signage systems utilize more advanced computer and video hardware and specialized software to dynamically render content elements on demand. These real-time systems have the major advantage of being able to instantly update screen content in response to manual or automatic triggers, unlike the conventional video playback systems which require an entire video clip to be re-rendered every time content needs to be updated. This greatly reduces production times and network bandwidth required to distribute content for playback in multiple locations, resulting in content that is more dynamic and visually appealing to the audience.

A major drawback of real-time digital signage tools is that they require a greater amount of development effort to create video and graphics content and integrate this content with real-time data sources. This translates into higher operating costs, making the return on investment for this type of digital signage system less attractive for many applications, despite the clear benefits to the audience in terms of more interesting and engaging content.

The process of creating real-time data-driven graphics for digital signage typically requires 4 primary steps: 1) Creation of graphical and video elements by a graphic artist; 2) Development of custom software applications or scripts by a software programmer to link graphical elements to data sources; 3) Distribution of graphical elements and software applications to final play-out locations using either a local or wide-area network, or a manual distribution medium such as CD-ROM; and 4) Monitoring and updating of system elements on an ongoing basis.

The currently available tools and systems provide a means for achieving each of these steps, but for the most part require a level of specialized knowledge that the average user must acquire through extensive training and hands-on experimentation.

BRIEF DESCRIPTION OF THE DRAWINGS

Embodiments of the invention will now be described by way of example only with reference to the appended drawings wherein.

DETAILED DESCRIPTION OF THE DRAWINGS following provides a digital signage content management system that uses existing interfaces such as web interfaces and turns existing commercially available graphics programs such as web based tools or locally run programs such as Microsoft PowerPoint® into a digital signage platform to facilitate developing and managing digital signage applications. The following enables digital signage content to be professionally created without requiring custom programming for each and every stream of new and/or changing content.

Figure 1:
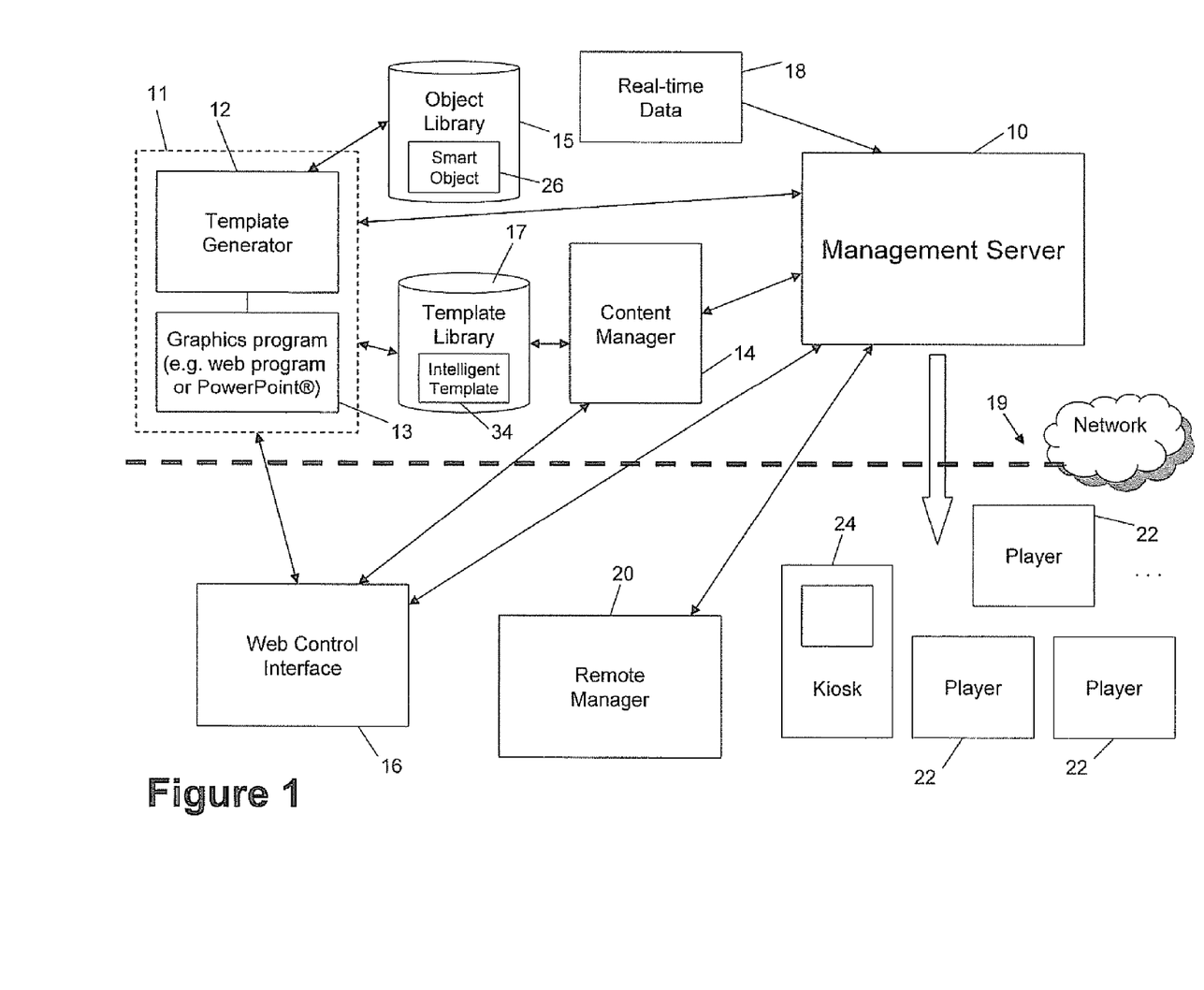
FIG. 1 is schematic block diagram showing a digital signage content management system.

Referring now to FIG. 1, in the example shown, the management system comprises an asset management server 10 for distributing new content to remote locations such as remote content players 22 and kiosks 24, and for receiving continuous status updates from the remote players 22, typically over a network 19. The server 10 can automatically send system alerts to support staff by email if problems should arise. The server 10 obtains real time data 18, such as news headlines, stock-market data, weather or custom content created by authors. The real time data 18 can be obtained in various formats such as RSS, HTML, XML and SQL to name a few.

The management server 10 operates with various other elements and, in many applications, various other entities to arrange and distribute the content to the players 22 and kiosks 24 or any other entity that utilizes the content. It will be appreciated that each element shown in FIG. 1 may be run independently and locally or may be combined with any one or more of the other elements at centralized locations. Also, as shown in FIG. 1, the elements may be accessed over the network 19 and thus provided on a web-based platform in addition to or rather than a locally run instance. The management server 10 obtains play lists of one or more intelligent templates 34 from a content manager 14, who accesses the intelligent templates 34 from a template library 17. The management server 10 is then able to combine the real-time data 18 with the respective templates 34 to continually and automatically update the content provided through the templates 34.

The intelligent templates 34, which are explained in greater detail below, are created by an authoring entity or program 11, which utilizes a template generator 12 an existing and commercially available, or otherwise convenient or familiar graphics program 13. The template generator 12 allows the user to create templates 34 using the familiar interface and functions provided by the graphics program 13. One example of a particularly suitable graphics program is Microsoft PowerPoint®. As can be seen, a web control interface 16 (e.g. a computer connected to the program 11 over the Internet) can be used to provide a web-based development environment. It will be appreciated that the template generator 12 and graphics program 13 may also be run locally or be PC based. The template generator 12 allows users to work directly inside the graphics program 13 such as PowerPoint® to develop high end digital signage productions. Using smart objects 26 as shown in FIG. 2 and intelligent templates as shown in FIG. 3, the template generator 12 can extend the capabilities of the graphics program 13 by adding signage features, allowing users to author content that includes video, animations, graphics, audio, live data and more.

The template generator 12 utilizes smart objects 26 to build the intelligent templates 34. In this way, certain properties and parameters defined for a smart object 26 can be inherited by the intelligent templates 34 such that by modifying an object 26, a template 34 can be modified. This allows standard objects 26 and templates 34 to be created that can change for each and every instance and use of the object 26 and template 34 for different applications. The smart objects 26 can be stored in an object library 15.

Figure 2:
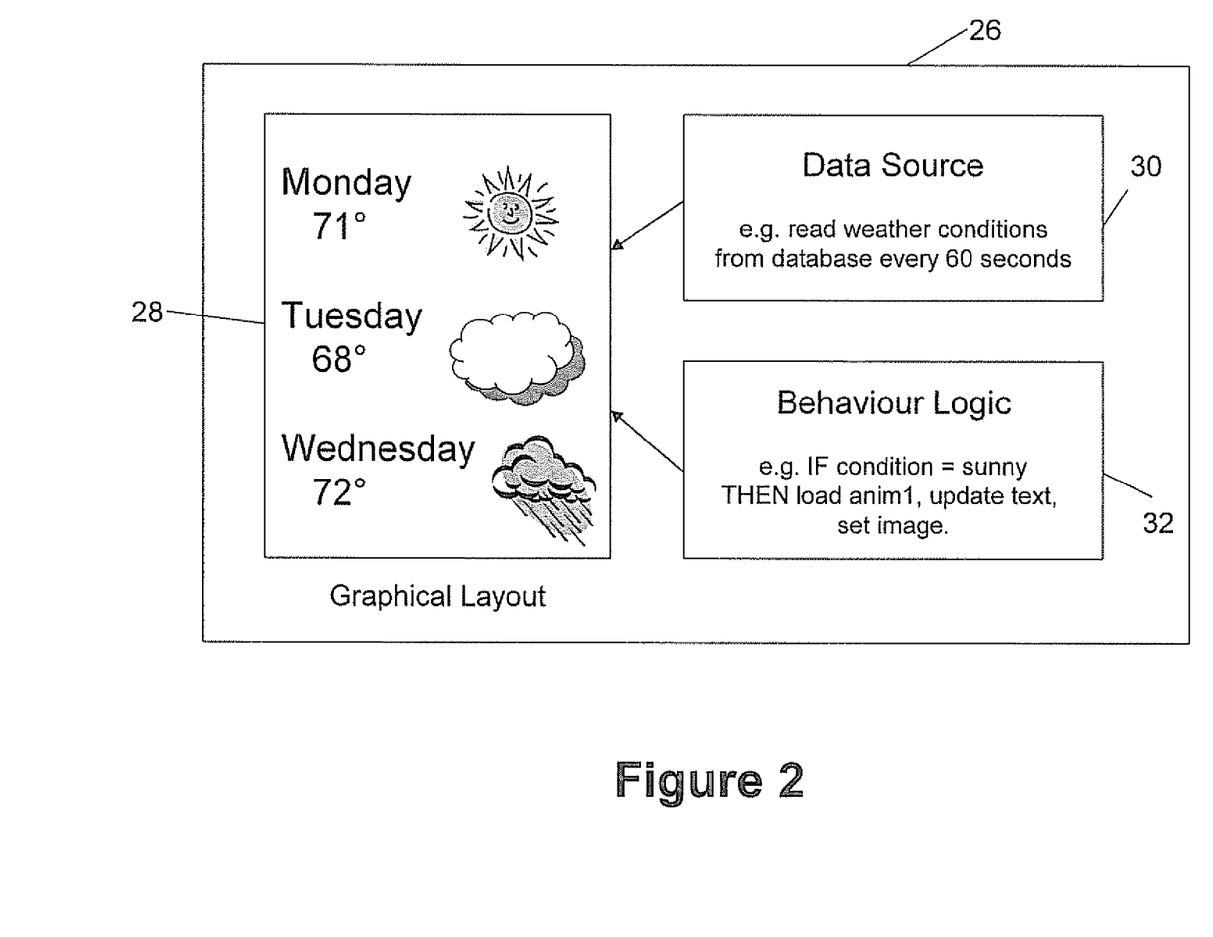
FIG. 2 is a schematic block diagram of a smart object.
Figure 3:
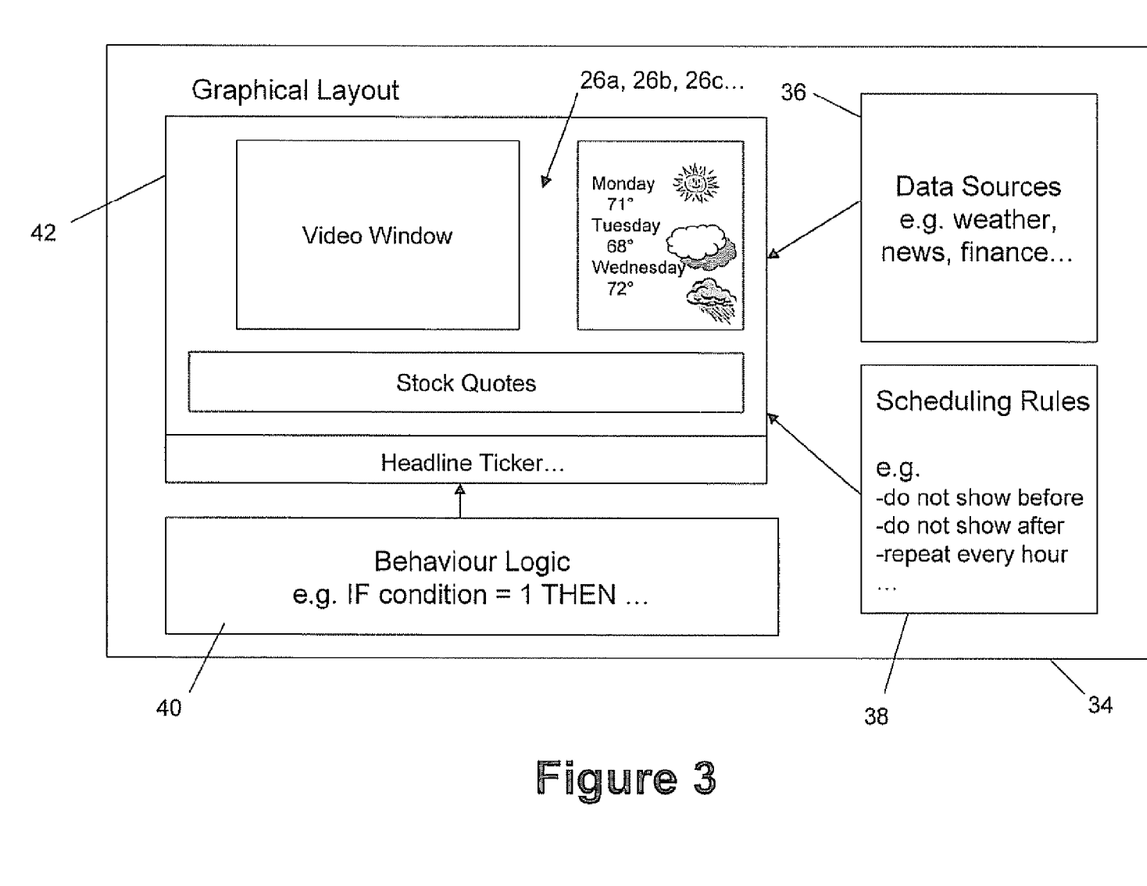
FIG. 3 is a schematic block diagram of an intelligent template.

As can be seen in FIG. 2, the smart object 26 includes a graphic layout 28, data source 30 and behaviour logic 32 to provide conditions for updating content provided by the object 26. As can be seen in FIG. 3, the intelligent template 34 has data sources 36, scheduling rules 38, behaviour logic 40 and a graphic layout 42.

The template generator 12 should be capable of dragging-and-dropping templates 34, adding unlimited layers of objects 26 anywhere on the screen, including multiple video windows, crawling data tickers, 3D animations etc. as well as enable the user to select from a library of professional, customizable templates and reusable objects. The user can create templates 34 once then automatically update video clips, images and dynamic text elements based on actions and business rules. The user can also link slide elements with information from databases, websites, RSS feeds or any other data source. Custom control or behaviour logic 32, 40 can also be defined using a scripting engine (not shown).

The content manager 14 allows the user to manage all aspects of control play-out from a single interface. This includes building play lists, updating template 34 information, defining play out schedules, and scheduling content delivery to any player 22 or group of players on the network 19. Updating templates 34 can be automated using predefined rules, making updating even complex play list content much easier and consistent, thus allowing non-skilled users to create custom signage. Graphics can be scheduled to play out at specific intervals or time-of-day; expiry dates can automatically delete slides after a specified time; templates 34, play lists and other assets can be dragged onto individual players 22 for automatic distribution; and shut down times for remote displays can be scheduled to preserve power and overall screen life. A web control 16 may provided to enable the user to manage content with web pages. This allows non-technical users to interact with the system to update specific areas without requiring knowledge of or access to the authoring tools such as the template generator 12. It will be noted that several separate web control interfaces 16 may be used (e.g. one for interacting with each element in FIG. 1) and one is shown in FIG. 1 for clarity.

The players 22 and kiosks 24 are typically broadcast rendering engines that deliver high quality output. The players 22 dynamically composite slide elements in real-time to generate the final video output. In this way, individual content elements do not need to be re-rendered whenever a change is required. The players 22 can use the same engine used by TV networks etc. The players 22 can automatically download and store all content locally allowing uninterrupted play out in the event of a network disruption. Inputs from cameras, cable/satellite feeds and DVD players should be supported as well as any resolution output from analog NTSC/PAL to DV1 to HD-SD1. The players 22 can also use an auto recovery feature to allow the player 22 to self-diagnose and solve system errors without user intervention.

A remote network manager 20 may be used to manage the content and monitor network status across multiple locations. The entire network 19 can be monitored and, should a problem be detected, corrective action can be taken prior to being noticed by the users. From the remote manager 20, content can be dragged-and-dropped from a local network to one or more remote locations, network of players 22 can be browsed and viewed live from any location, email alerts can be received when a problem occurs, detailed technical stats can be viewed for any player 22, system and run logs can be viewed for any player 22, disk space and usage can be managed for all players 22 automatically, and control commands can be sent to one or more locations for automating tasks such as turning screens on or off.

The system shown in FIG. 1 can be adapted for use in any environment. For example, players 22 can be used in retail displays, public information displays, airports, museums, in entertainment and hospitality, casinos, for corporate communications, university displays, medical facility displays, multi-zone information channels, employee training functions and self-service and information kiosks (e.g. kiosk 24).

The system introduces a concept of reusable "smart" components that include a plurality of graphics or video elements, a data layer, and a behaviour layer. These self-contained components can be used to generate a portion of a display, such as a weather or stock ticker, or an entire full-screen video output comprising multiple elements, each with its own set of data sources and individual behaviours.

The use of smart components greatly reduces the need for specialized training on the part of the end user. Whereas in prior systems a user required a certain minimum level of competency as a graphic artist or software developer, the introduction of smart components allows users without any specialized knowledge to quickly and easily create complete video graphics digital signage applications that combine real-time information sources with dynamic display characteristics.

As shown in FIGS. 2 and 3, the system operates using two main components: "Smart Objects" 26 and "Intelligent Templates" 34. Smart objects 26 form the building blocks needed to create a digital signage display, and intelligent templates 34 dictate the layout and production logic needed to generate the final video graphics output. Multiple smart objects 26 can be included in an intelligent template 34, and multiple templates 34 can be created from a library of smart objects 26.

Smart objects 26 in this example, may include the following basic characteristics: 1) An object 26 can contain an unlimited number of graphical elements, including text, images, animations, and video; 2) Multiple objects 26 can be used simultaneously to form a composited rich media final output; 3) Each object 26 is entirely self-contained, including all of the graphical and video elements, data sources, and business rules needed to generate a final output; and 4) Objects 26 can be self-configuring, allowing the output to be dynamically modified in response to data triggers, without the need for user intervention. An example of this is a weather graphics that automatically displays a cloud animation when it is cloudy or a sun animation when it is sunny, or a financial graphic that shows a red downward pointing arrow when the stock market is down or a green up arrow when the market is up.

The smart objects 26 are considerably powerful for the end user, since it not only encompasses an object's graphical elements 28, but also the rules or behaviour logic 32 which define how the graphical elements will respond to continuously changing inputs from the data sources 30.

A typical example of using smart objects 26 involves retail displays installed in a department store. A display could be configured to display a continuous loop of video, images, and promotional text associated with the specials of that week. A smart object 26 within the display layout can be designed to integrate with the department store's inventory management system. If the inventory level for any of the items displayed on the screen falls below a minimum threshold, the object automatically switches to an alternative set of specials on items for which inventory is available. Without smart objects 26, this example would require custom software development for each screen layout that is required. With smart objects 26, the rules are defined once, and then reused again and again for any number of screen layouts. Also, the behaviour logic 32 can be used to interrelate multiple objects 26 such that an event relevant to one object 26 triggers a change in another object 26. Using the above example, in a retail environment, a change in the weather, e.g. it begins to rain can trigger a change in advertising for merchandise, e.g. rain wear or umbrellas.

To use an object 26 to create a portion of a final video output, a user can simply drag and drop the component from a browser window (organized in the template generator 12) onto the workspace, or "canvas" (provided by the graphics program 13). The component's graphical elements and layout, as well as any internal logic and business rules, are automatically added to the canvas. By dragging and dropping multiple objects 26 onto the canvas, a user can create a complete finished layout in a matter of seconds. This results in much more than a simple graphics layout. When the layout is displayed on a video screen, each of the components automatically configures itself and automatically displays live graphics and video information based on its internal logic 32 and behaviour definitions.

Typical examples of smart objects include: 1) Weather objects showing real-time weather conditions; 2) Sports tickers showing live sports results; 3) Headline tickers that continuously scroll live news information; 4) Video windows that automatically play through a loop of video content; and 5) Alert pop-ups that automatically appear in the event of a fire alarm or weather warning.

Intelligent templates 34 typically include the following characteristics: 1) Layout information defining where each individual object is located on the final output display; 2) Dynamic parameters that can be changed by the user without requiring a re-edit of the template, which can be as simple as a video filename that can be set by the user for a full screen video template, or as complex as a drop list of branding options, each of which completely redefines the entire template layout with a single click; 3) Rules defining how individual objects interact with each other; 4) Scheduling information, defining where and when each template should be displayed; 5) Expiry dates for content, allowing templates to be displayed only within a specified validity period; and 6) Business rules dictating how a template should be reconfigured based on dynamic data inputs, e.g., a single template which, when displayed in a certain location, displays video content applicable to that audience demographic, but when displayed in a different location, displays entirely different video content applicable to a different audience demographic.

Templates 34 should include everything necessary to generate a complete digital signage output, including graphical elements, video components, multiple data inputs, animations, business rules, and scheduling information 38.

Using the combination of smart objects 26 and intelligent templates 34, users can build libraries of hundreds or thousands of reusable components, which can be stored in the object library 15 and the template library 17. These libraries 15, 17 can be shared between users in the same physical location or in multiple geographic locations, e.g. through a web control interface 16. For many applications, generic default or otherwise existing objects 26 and templates 34 can be used "as is" without modification. For other applications, users can select an existing object 26 or template 34, modify the parameters of that object 26 or template 34, and save it as a new component.

A typical scenario would involve multiple levels of users: 1) Advanced users would create objects by combining graphics, data, and programming elements; 2) Intermediate users would build new digital signage projects by drawing from existing library elements; and 3) Less advanced users would manage the scheduling and custom information displayed by the objects and templates on the final display output.

Figure 4:
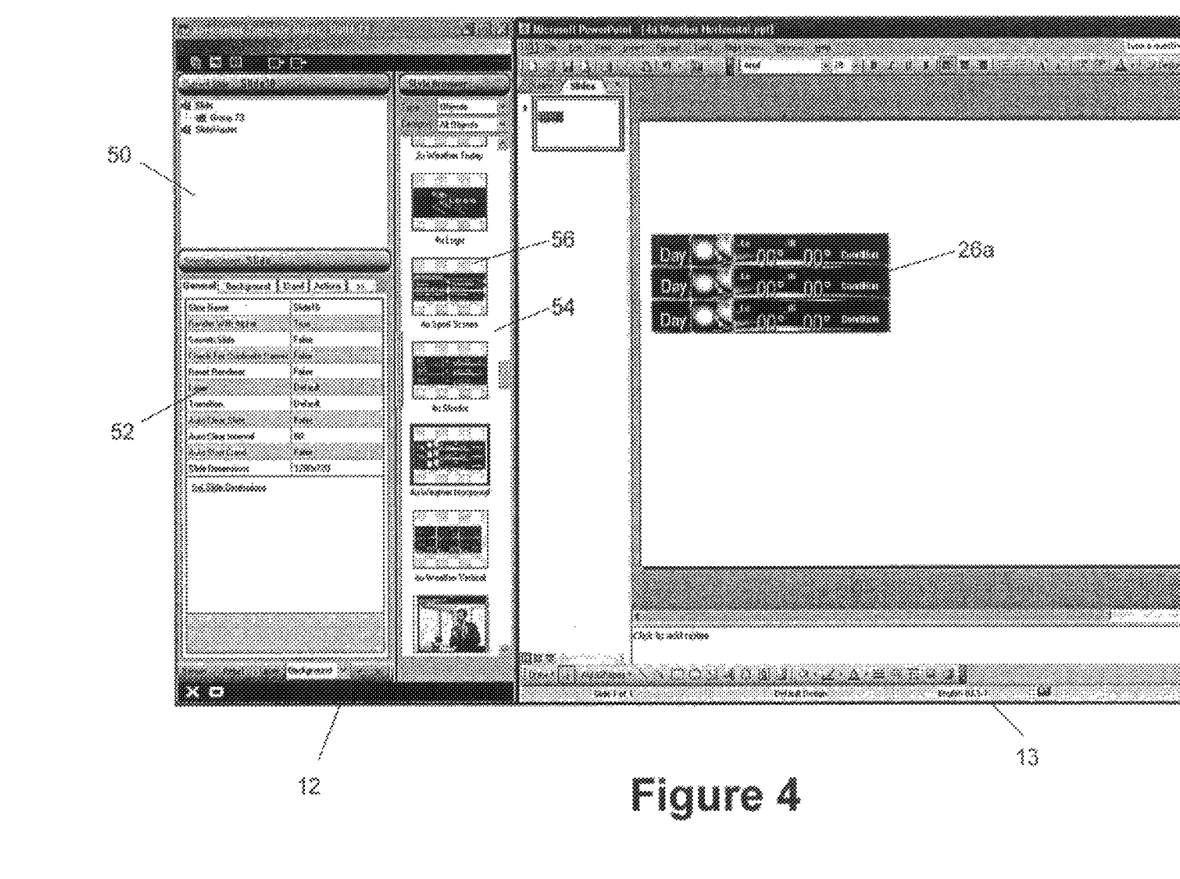
FIG. 4 is a screen shot showing a user interface for the template generator and graphics program shown in FIG. 1.

Turning now to FIG. 4, an exemplary user interface (UI) for the template generator 12 and graphics program 13 is shown. In this example, the template generator 12 and graphics program 13 are used side-by-side to facilitate easy drag and drop motions for placing objects 26 onto the "canvas" provided in this example by Microsoft Power-Point®. The template generator 12 comprises a slide navigation window 50 for illustrating a list of the elements that comprise the template 34 that is currently being edited using the template generator 12. These elements may include primitives live text and images or complete objects. For example, each object can be created and presented in a different slide and multiple slides can be used to build a template 34. A properties window 52 is also provided for setting parameters of the template 34 that is being created in the graphics program 13. A style browser 54 is also provided, which in this example shows a list of object previews 56. The style browser 54 can also show predefined text styles, image and video clip libraries and thumbnail views of all completed templates 34 in the template library 17. As can be seen in FIG. 4, a weather object 26*a* has been selected from the browser 54 and placed in the graphics program 13, e.g. by a drag and drop operation. The weather object 26*a* will carry with it, the data sources 30 and behaviour logic 32 required to update the content provided through the object 26*a*. This in turn will change the template 34 and thus the final output as the content is played.

Figure 5:
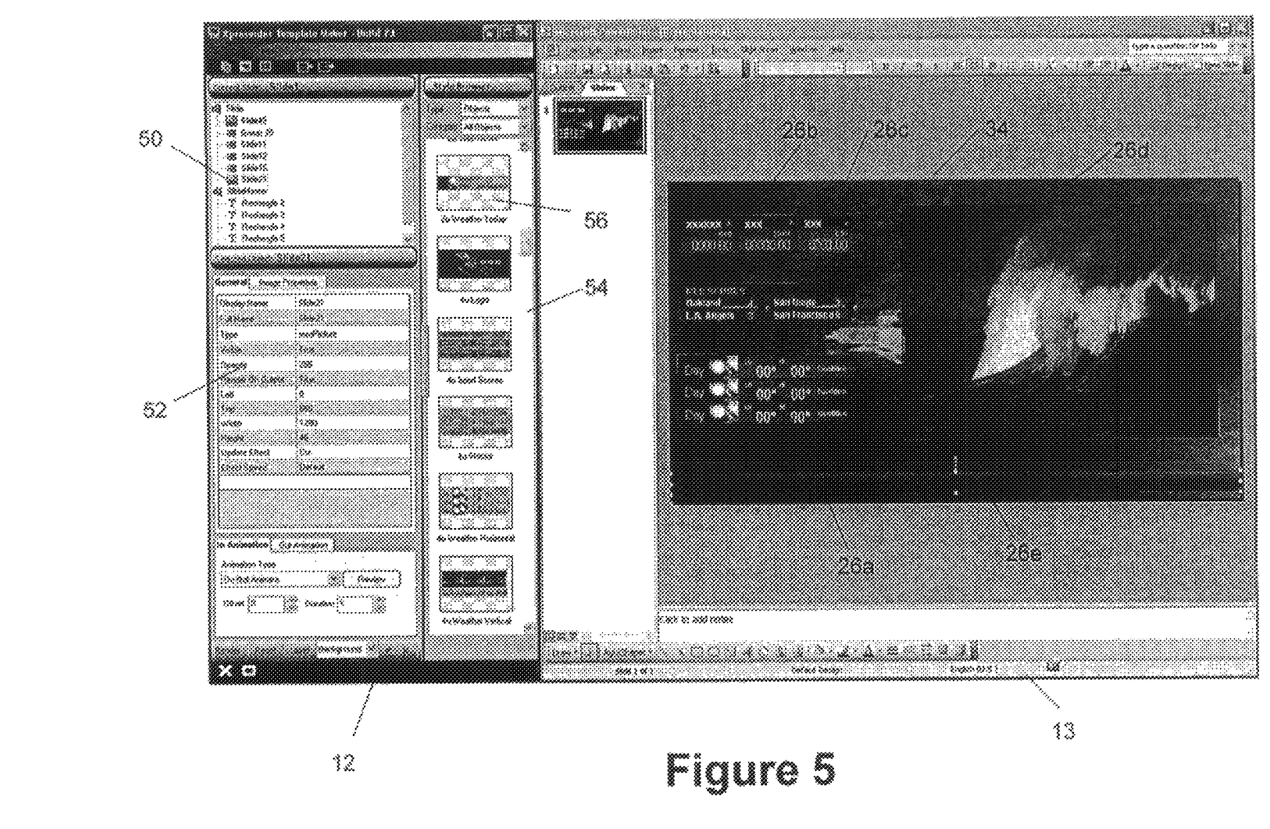
FIG. 5 is another screen shot of the user interface of FIG. 4.

FIG. 5 illustrates a fully generated template 34, which includes the weather object 26*a*, a stock object 26*b*, a sport scores object 26*c*, a video display object 26*d* and a news ticker object 26*e*. This allows the user to define a particular layout and combination of objects 26 for a particular application. The template 34 itself has parameters, as will be explained below, that then allows the user to use the same template 34 in multiple instances and in multiple locations or applications to avoid re-developing standard layouts.

Figure 6:
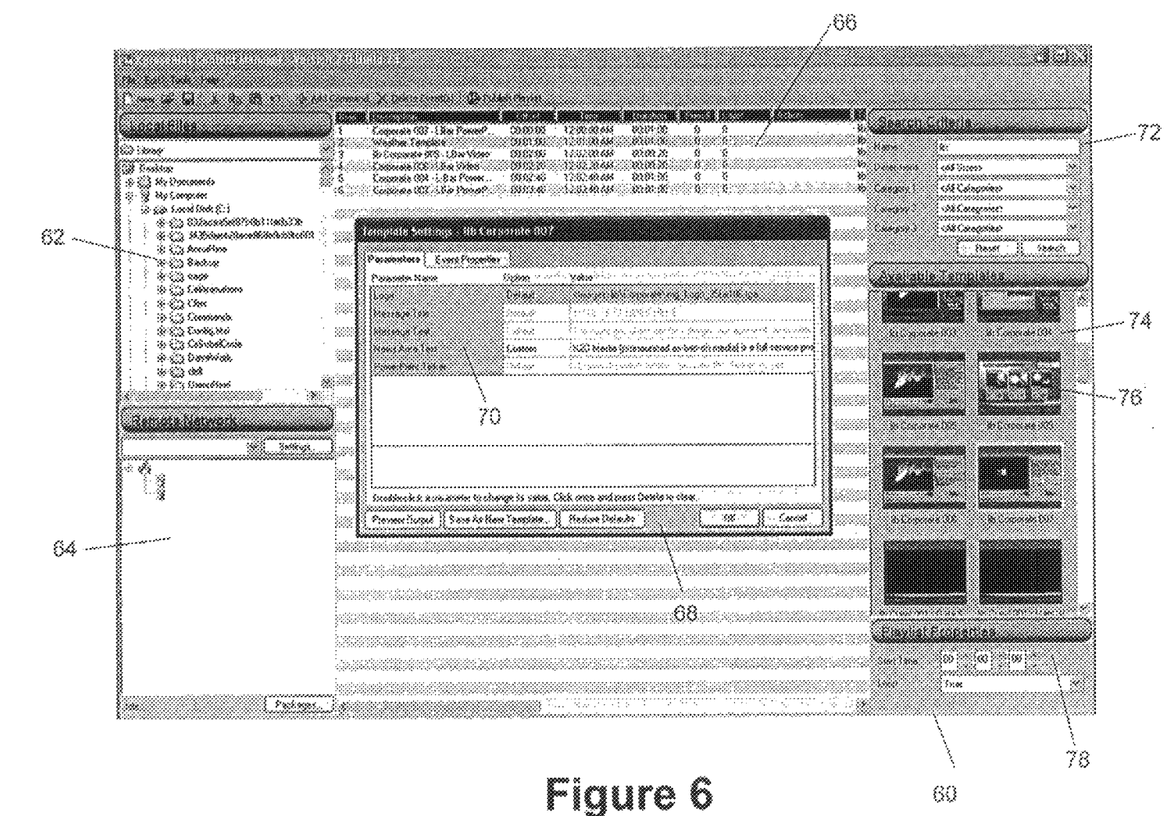
FIG. 6 is a screen shot showing a user interface for the content manager shown in FIG. 1.
Figure 8:
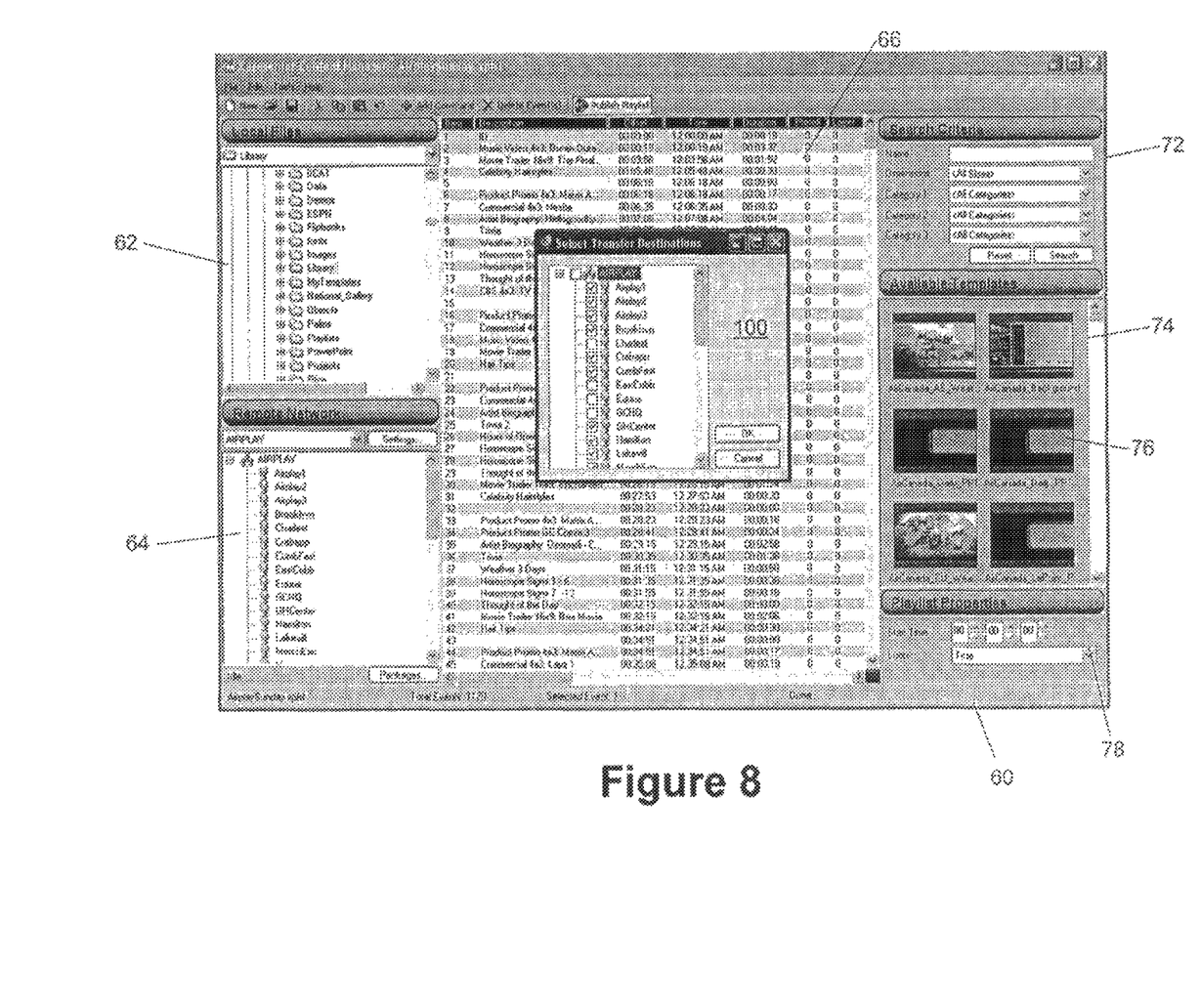
FIG. 8 is a screen shot showing the user interface for the content manager when initiating a content transfer.

FIG. 6 illustrates an exemplary UI 60 for the content manager 14. The content manager UI 60 allows a user to import templates 34 from the template library 17 and configure the templates 34 such that they play out in a particular way for that application. It can be seen that six (6) templates 34 are defined for the play list in this example and a template settings window 68 is loaded as a new template 34 is added. The template window 68 lists the parameters so that the user can review these and decide whether or not modifications are necessary and if so, make the necessary changes. A new template 34 may be selected from a file explorer window 62 and thus it may be appreciated that more than one template library 17 may exist. A network window 64 is also provided to give network information for the players 22 and/or kiosks 24 relevant to a particular network of content providers, which may or may not be related to each other. A search tool 72 may be provided to enable the user to search for templates 34 and the templates available at either a specified location in the file structure shown in the window 62 or found in a search can be displayed. The play list properties can also be set and modified using a properties tool 78. FIG. 8 shows a transfer tool 100 that can be used in the content manager UI 60 for selecting the remote destinations to which the content is provided by sending a particular play list.

Figure 7:
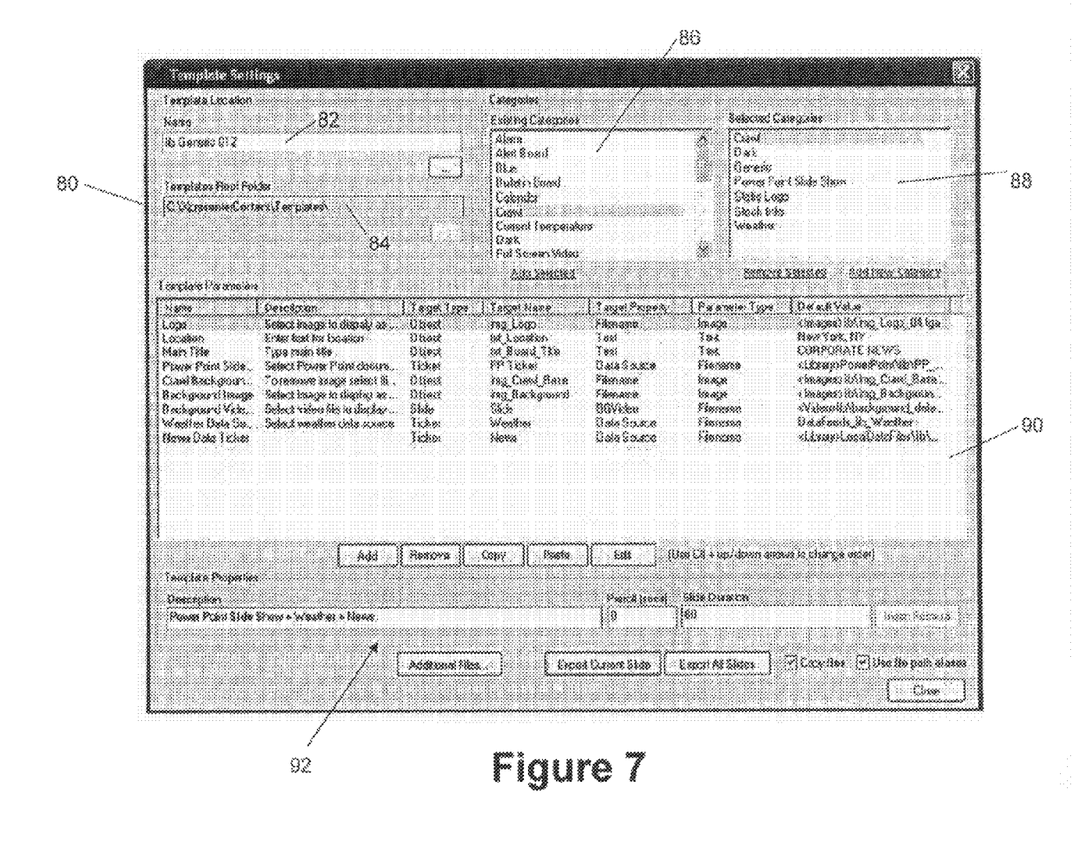
FIG. 7 is a screen shot showing a user interface for a template settings program accessed through the content manager shown in FIG. 6.

Turning now to FIG. 7, a template settings UI 80 is shown which allows parameters of a template 34 being created using the template generator 14, to be modified. A template 34 that has been selected is named in box 82 and a pointer 84 to the main template library folder is also provided. A categories list 86 is provided, which lists all categories that have been defined in the template library 17. The selected categories list 88 shows the categories that the particular template 34 belongs to. The template parameters 90 are listed below, which is a list of parameters that the user can modify when adding the template 34 to a play list in the content manager UI 60. This list can be the same list identified by numeral 70 in FIG. 6. For example, the logo is listed, which describes the logo, indicates that it is an object having a certain name, property and type and gives the default value. Parameters 90 can be added, removed, copied, pasted and edited through this list. Template properties 92 are also given, which can be edited. For example, the slide duration can be specified. It can therefore be seen that during creation of a template 34, the parameters and properties can be modified to "intelligently" define how the final output is updated and how it may change during a play out. This can drastically reduce development times and allows greater flexibility in creating custom signage and custom content.

Figure 9:
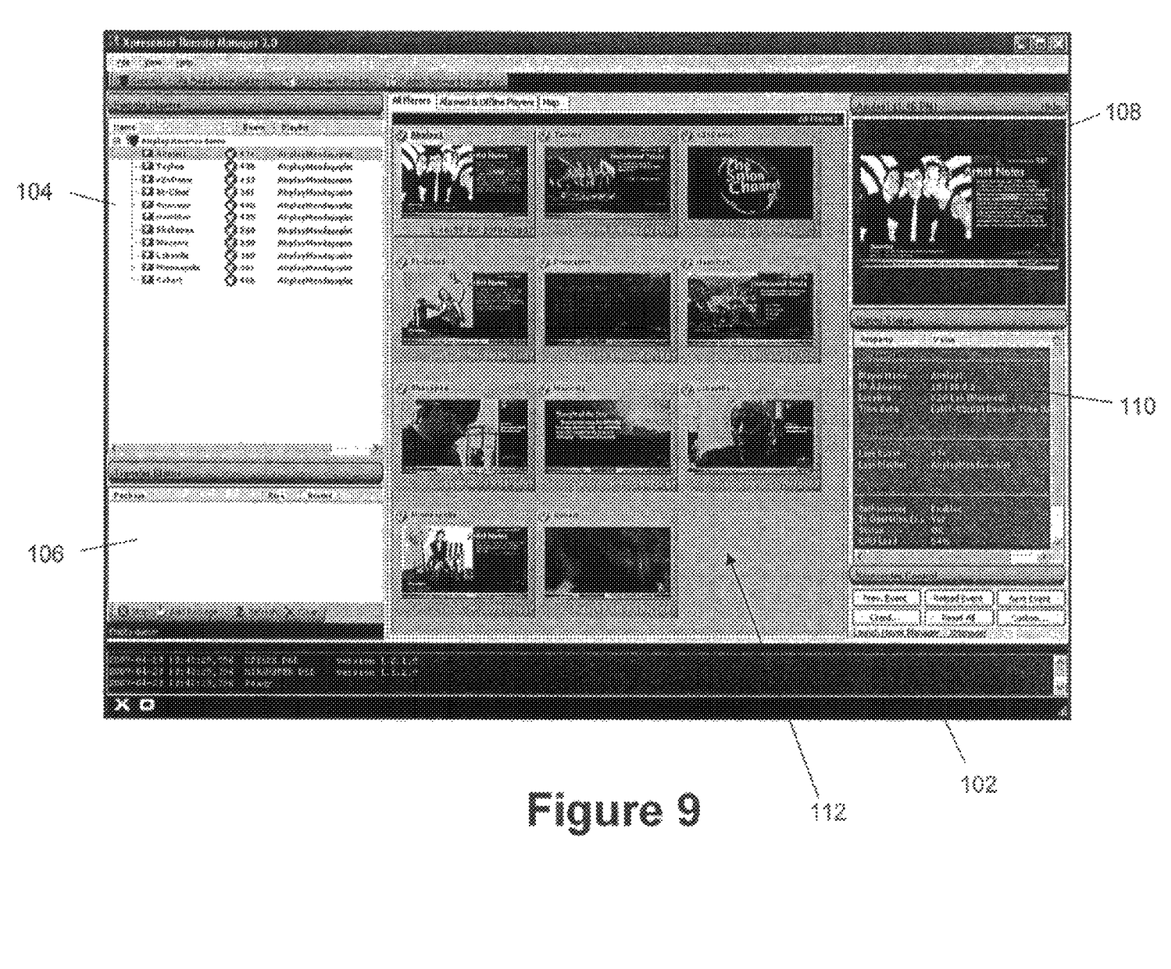
FIG. 9 is a screen shot showing a user interface for the remote manager shown in FIG. 1.

FIG. 9 shows a remote manager UI 102, which can be used as an administrative tool for managing and monitoring the output of each player 22 and kiosk 24 in a given network of content providers. In this example, a list of players 104 is provided, which specifies which play list is being played. A transfer status window 106 may also be provided to give the user information regarding the transfer of the play list to the content providers. A preview pane 108 is provided that shows a highlighted one of the destinations that is selected from a collection of previews 112. A status window 110 can also be used to provide status information pertaining to the selected player 22. The remote manager UI 102 can be used by the remote manager 20 shown in FIG. 1 or can be used directly by the management server 10 if they are separate and remote entities. In this embodiment, the remote manager UI 102 is a PC-based application for monitoring networks of players 22 etc. but may also be a web-based interface and thus should be accessible anywhere.

Figure 10:
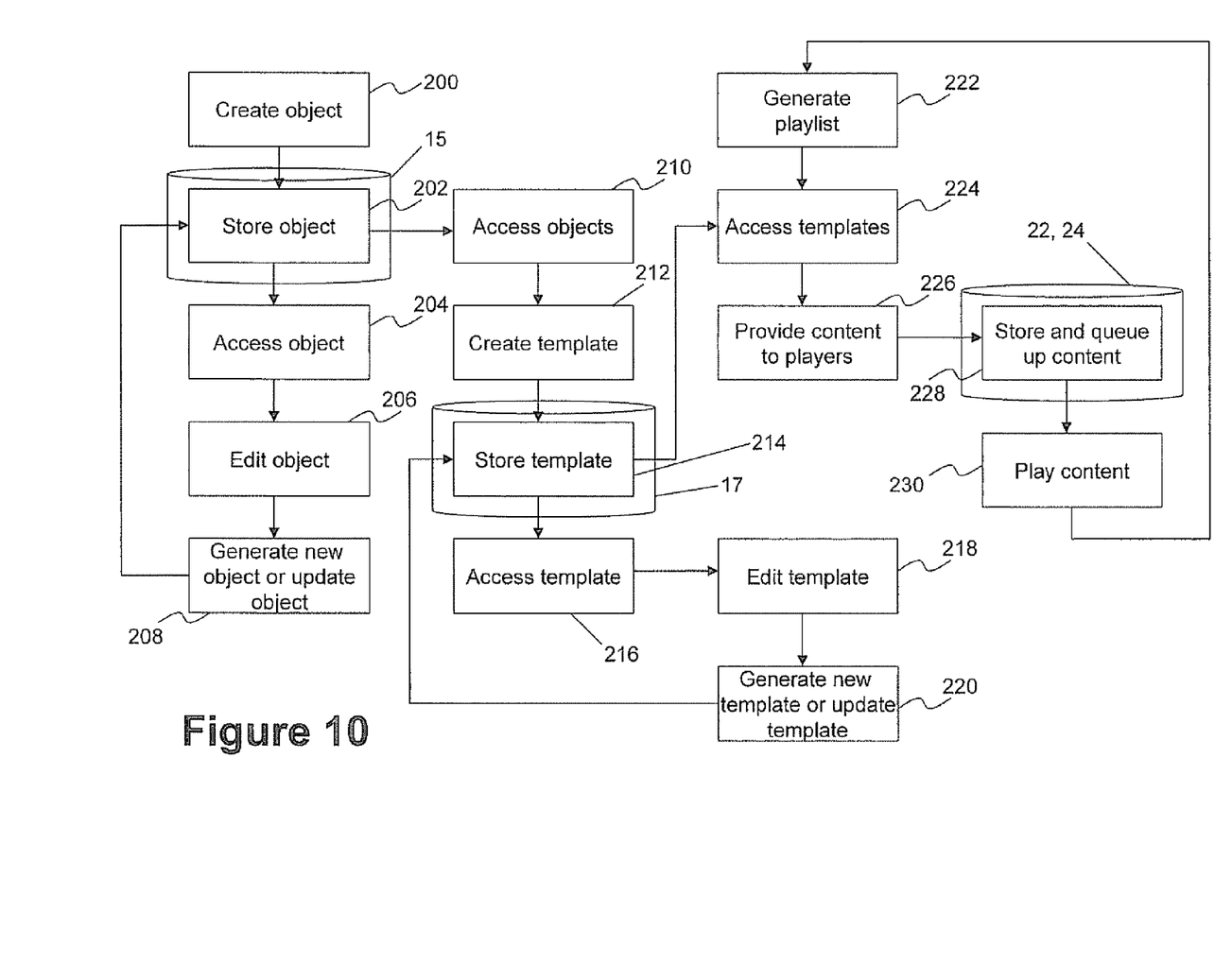
FIG. 10 is a flow chart illustrating the creating, editing and use of smart objects, intelligent templates and play lists using the system shown in FIG. 1.

Turning now to FIG. 10, a flow chart is shown that illustrates the creating, modification, access and use of the objects 26, templates 34 and play lists generated therefrom. At 200, an object 26 is created. This can be done at any time and then stored in the object library 15 at 202. In this example, an object 26 is accessed for two different reasons, namely to edit the object 26 or its properties and parameters, and to add the object 26 to a template 34. At 204, the object 26 is accessed from the object library 15 and edited at 206. This may then generate a new distinct object 26 or may simply overwrite the existing object 26 at 208. In either case, the new or modified object is stored in the object library 15. At 210, the object (and likely other objects 26) are accessed and a template 34 is created using those selected objects 26 at 212. The newly created template 34 is then stored in the template library 17 at 214. Similar to the objects 26, the templates 34 may be accessed for modification purposes, to create new templates 34 from existing ones, and to generate play lists. At 216, the template 34 is accessed and edited at 218. The template 34 is either modified and overwritten or a new template 34 created at 220 and the new or modified template 34 is stored in the template library 17. At 222, a play list has been generated or is in the process of being generated and the user wishes to add the template 34 to the play list. In this case, the template 34 is accessed from the template library 17 at 224. The play list, thus created then forms a set of content that is provided to the players 22 and/or kiosks 24 at 226, which store and queue up the content at 228. The content is then played at 230 by executing the play list. It can be seen that this process can be repeated to obtain (e.g. download or receive) new play lists.

It can therefore be seen that the above-described system can be used to provide a digital signage content management system that uses existing interfaces such as web interfaces and turns existing commercially available graphics programs such as web based tools or locally run programs such as Microsoft PowerPoint® into a digital signage platform to facilitate developing and managing digital signage applications. The following enables digital signage content to be professionally created without requiring custom programming for each and every stream of new and/or changing content.

Although the invention has been described with reference to certain specific embodiments, various modifications thereof will be apparent to those skilled in the art.

The invention claimed is:

1. A method for generating objects for a digital display comprising:
   enabling an object layout to be defined for presenting data within said object using an interface provided by an existing graphics program;
   enabling one or more data sources to be identified for obtaining said data;
   enabling behavior logic to be created for responding to changing inputs from said one or more data sources, said behavior logic being executable to self-configure a respective object to dynamically modify its output in response to at least one data trigger, without user intervention, said behavior logic interrelating said object with at least one other object to have an event related to said object trigger a change in said at least one other object;
   enabling said object to be stored in a library of objects with said at least one other object to enable said objects to be available to multiple applications; and
   enabling said object to be used with said at least one other object in digital display output by:
      enabling said object to be added, with at least one other object from said library of objects, to a reusable template that inherits said data sources and said behavior logic to individually control said object in conjunction with said at least one other object within said template; and
      executing said behavior logic for said object, during use of the template in providing the digital display output.

2. The method of claim 1, further comprising enabling at least one of said layout of said objects, said behavior logic, one or more scheduling rules and said data sources to be modified.

3. The method of claim 1, wherein each of said plurality of objects comprises a data structure in a format applicable to a web-based graphics program.

4. The method of claim 1 wherein said object layout, said one or more data sources and said behavior logic are stored as a set of modifiable parameters.

5. The method of claim 1, wherein said data is provided by said data source in real-time and said plurality of objects are configured to be updated in real-time.

6. A non-transitory computer readable medium comprising computer executable instructions for generating objects for a digital display, comprising instructions for:
   enabling an object layout to be defined for presenting data within said object using an interface provided by an existing available graphics program;
   enabling one or more data sources to be identified for obtaining said data;
   enabling behavior logic to be created for responding to changing inputs from said one or more data sources, said behavior logic being executable to self-configure a respective object to dynamically modify its output in response to at least one data trigger, without user intervention, said behavior logic interrelating said object with at least one other object to have an event related to said object trigger a change in said at least one other object;
   enabling said object to be stored in a library of objects with said at least one other object to enable said objects to be available to multiple applications; and
   enabling said object to be used with said at least one other object in digital display output by:
      enabling said object to be added, with at least one other object from said library of objects, to a reusable template that inherits said data sources and said behavior logic to individually control said object in conjunction with said at least one other object within said template; and
      executing said behavior logic for said object, during use of the template in providing the digital display output.

7. The non-transitory computer readable medium of claim 6, further comprising enabling at least one of said layout of said objects, said behavior logic, one or more scheduling rules and said data sources to be modified.

8. The non-transitory computer readable medium of claim 6, wherein each of said plurality of objects comprises a data structure in a format applicable to a web-based graphics program.

9. The non-transitory computer readable medium of claim 6 wherein said object layout, said one or more data sources and said behavior logic are stored as a set of modifiable parameters.

10. The non-transitory computer readable medium of claim 6, wherein said data is provided by said data source in real-time and said plurality of objects are configured to be updated in real-time.

* * * * *